July 12, 1932.  B. H. SHINN  1,866,942
REFUELING EQUIPMENT
Filed Dec. 23, 1929   5 Sheets-Sheet 1
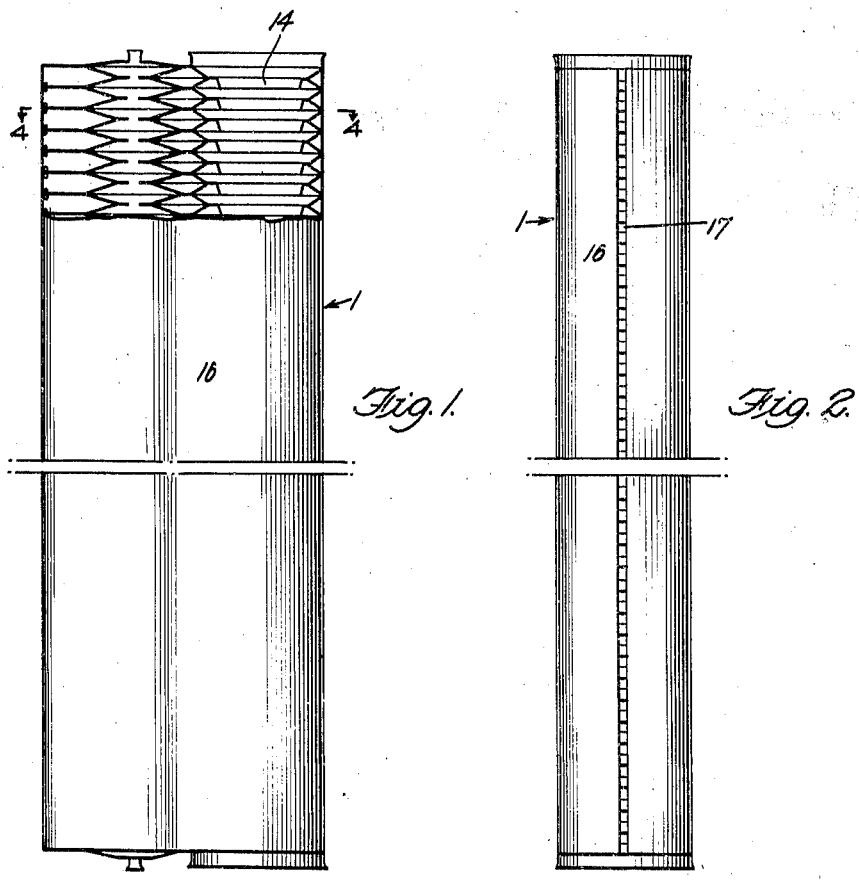
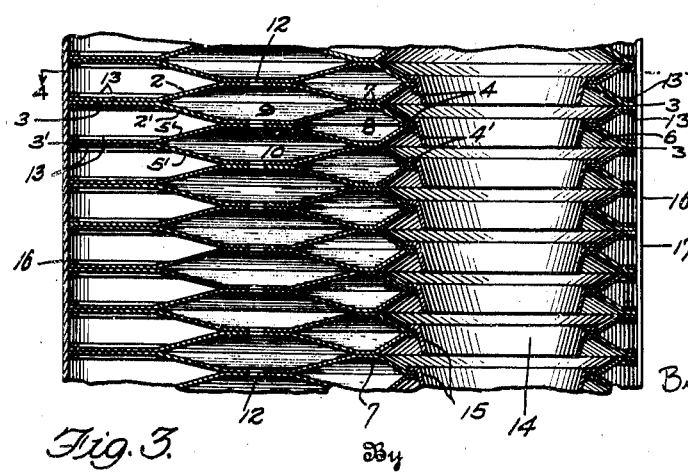

July 12, 1932.  B. H. SHINN  1,866,942
REFUELING EQUIPMENT
Filed Dec. 23, 1929   5 Sheets-Sheet 2
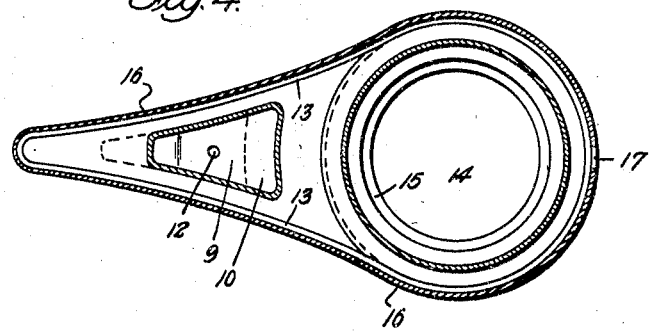
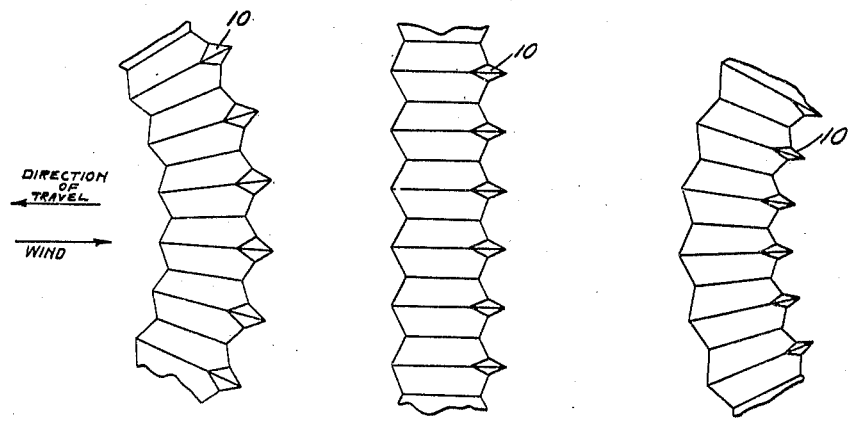

Inventor
Byron H. Shinn
By Fisher Pedersen
Attorneys

July 12, 1932.　　B. H. SHINN　　1,866,942
REFUELING EQUIPMENT
Filed Dec. 23, 1929　　5 Sheets-Sheet 4
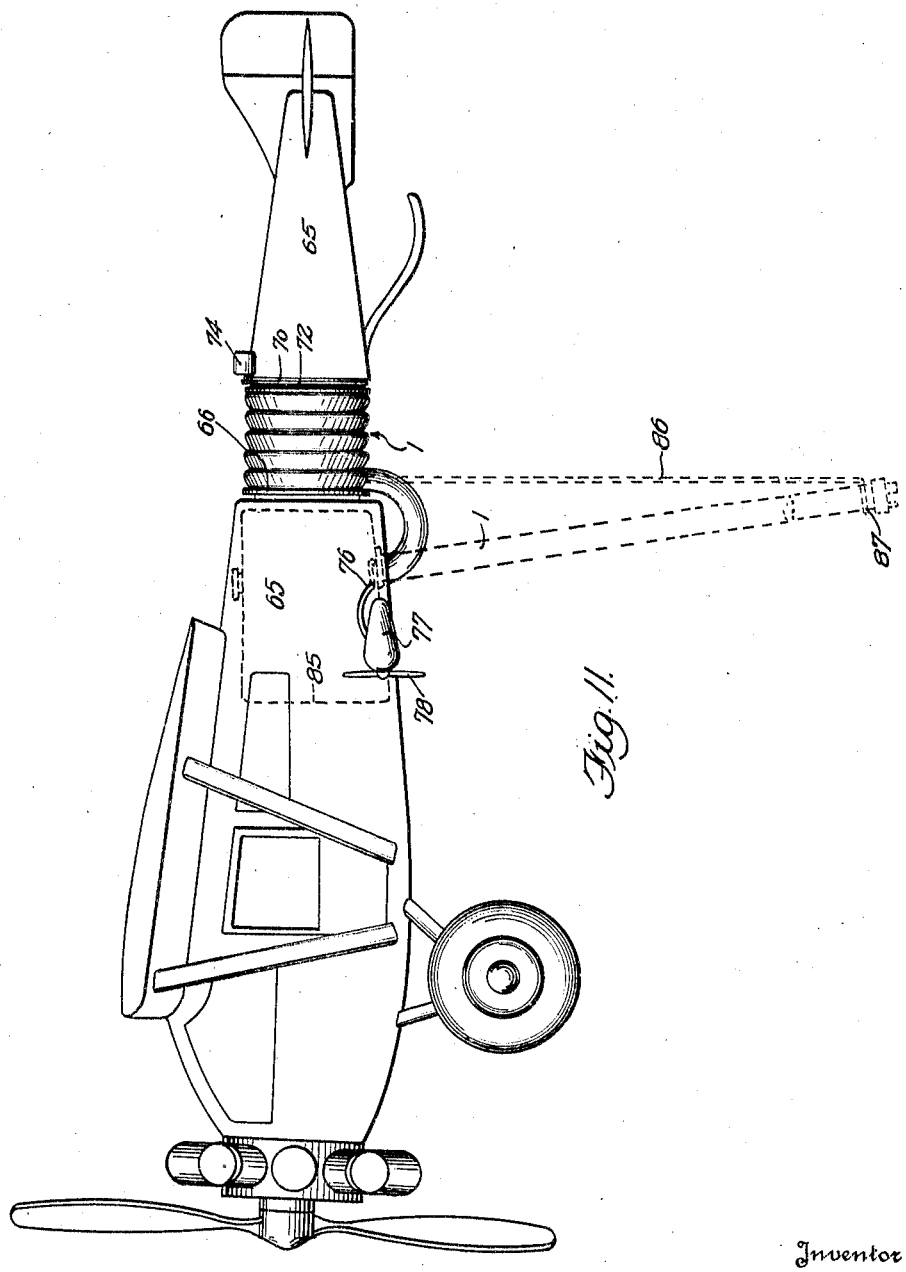
Inventor
Byron H. Shinn
By
Fisher & Pedersen
Attorneys

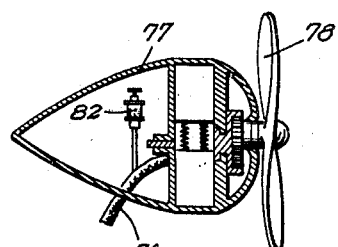
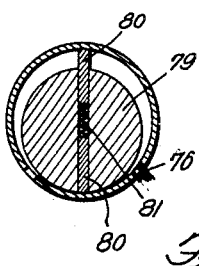
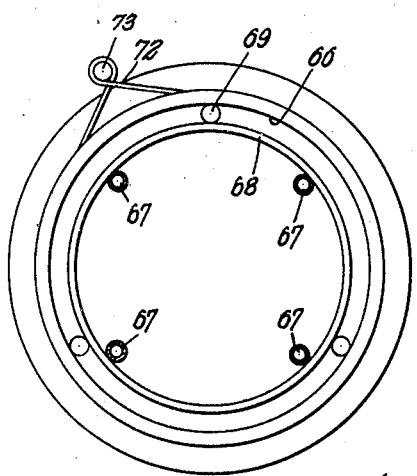
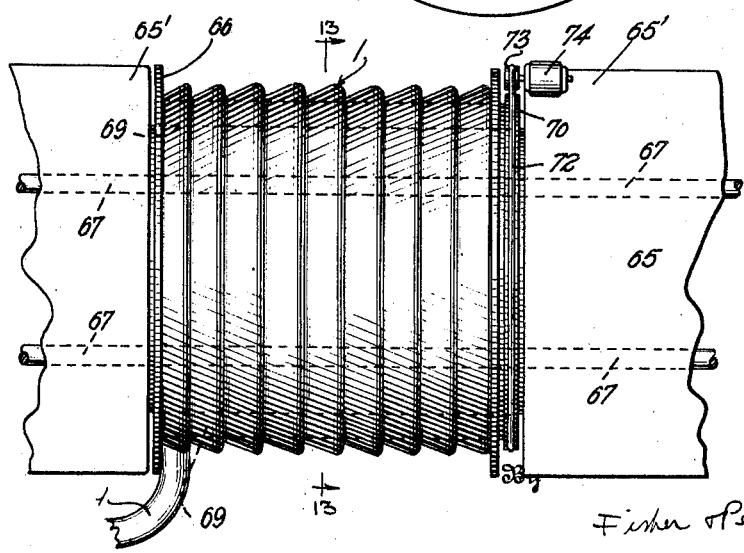

Patented July 12, 1932

1,866,942

UNITED STATES PATENT OFFICE

BYRON H. SHINN, OF WASHINGTON, PENNSYLVANIA, ASSIGNOR TO SHINN DEVICES CORPORATION, OF WASHINGTON, PENNSYLVANIA, A CORPORATION OF DELAWARE

REFUELING EQUIPMENT

Application filed December 23, 1929. Serial No. 416,144.

This invention is in refueling equipment for aircraft in flight. For convenience, it will be described in connection with the refueling of one airplane by another, but the invention is, of course, applicable to lighter-than-air craft, as well as heavier-than-air craft.

The invention comprises a number of features in refueling equipment which may be conveniently considered under three heads:

A. The extensible conduit or refueling pipe.

B. The valve mechanism and securing devices carried by the lower end of the pipe or conduit.

C. The reel and associated mechanism carried by the mother ship, on which reel the pipe is wound.

The liquid carrying pipe or conduit of this invention is made extensible, so that if after contact has been made between the two ships, one draws away from the other, contact will not be broken, but will be maintained by the stretching of the pipe. In its preferred form, the pipe is made up of a number of interconnected bellows sections, so that if a stretching force is exerted on the pipe it will very readily elongate and so accommodate itself to this stretching force.

In order to decrease wind resistance, the refueling pipe is made streamlined, and in order further to lessen air resistance, there is provided an enveloping membrane. This enveloping membrane is also elastic so that it stretches as the pipe elongates.

A possible difficulty to be reckoned with in a pipe which stretches or elongates is that the wind pressure, which at the speeds at which airplanes fly is very considerable, would tend to bend back the pipe to its full length, which is undesirable because it would lengthen the time of the refueling operation and because the pipe might become entangled with the tail surfaces of either of the planes. A spring might be used to counteract this tendency of the pipe to bow back, but a probable difficulty with a spring is that on account of the fact that the elongation is proportional to the force applied, if the pipe were stretched to say twice its length the force exerted by the spring would be so great that forces difficult to handle would be encountered, which would cause the pipe to snap back upon release by the receiving ship, etc.

According to this invention, in order to counteract the wind pressure, there is provided in the rear part of the conduit a series of interconnected chambers which are subjected to suction or a partial vacuum, which tends to draw them together, which in turn tends to make the pipe bow into the wind, and so tends to counteract the force of the wind tending to make the pipe bow the other way.

The valve mechanism at the lower end of the conduit comprises a valve which is opened manually, and which if released by the operator will immediately and automatically close. Associated with the valve housing are latch or hook means for securing the valve in place on the receiving ship. This latch or hook mechanism is controlled by the same handle which controls the valve, being arranged so that if the handle is released, the valve will be closed as above mentioned, and at the same time the latch or hook mechanism automatically disconnected.

Automatic means are also provided for closing the valve when the liquid in the receiving reservoir has reached a predetermined level. This is accomplished through the suction or vacuum part of the conduit. To this end, there is provided a liquid passage from the lower end of the valve housing into a float chamber. When the liquid in the receiving reservoir has nearly filled it, liquid is sucked up this passage and lifts the float which causes a diaphragm to be subjected to the vacuum or low pressure in the conduit, the diaphragm tripping a latch which releases the valve and allows it to close automatically.

The reel carried by the mother ship comprises a drum which is mounted exteriorly of the fuselage to rotate on an axis extending fore and aft of the fuselage, the drum being mounted substantially concentrically of the fuselage. The drum is arranged to encircle the longerons of the fuselage.

A vacuum or suction pump preferably wind driven, is carried by the mother ship and is adapted to be connected to the vacuum chambers in the conduit.

The main features of the invention having been thus outlined, these several features will now be described in more detail, reference being made to the accompanying drawings, illustrating the present preferred embodiment of the invention. It should, however, be understood that the invention is not to be limited to the specific details illustrated, but the inventive thought may be carried out in other ways.

In the drawings,

Fig. 1 is a side view of a part of the conduit;

Fig. 2 is a front view of the same;

Fig. 3 is an enlarged sectional view looking from the side of the conduit;

Fig. 4 is a section on the line 4—4 of Fig. 1;

Fig. 5 shows the position the pipe tends to assume by reason of the vacuum chambers;

Fig. 6 shows the position the pipe tends to assume by reason of the wind pressure;

Fig. 7 shows the theoretical position where these two forces balance;

Fig. 11 shows the reel on the mother ship;

Fig. 12 is an enlarged view showing the mounting of the reel;

Fig. 13 is a section on the line 13—13 of Fig. 12;

Figs. 14 and 15 are side and cross sections of a wind driven vacuum pump.

Figure 8:
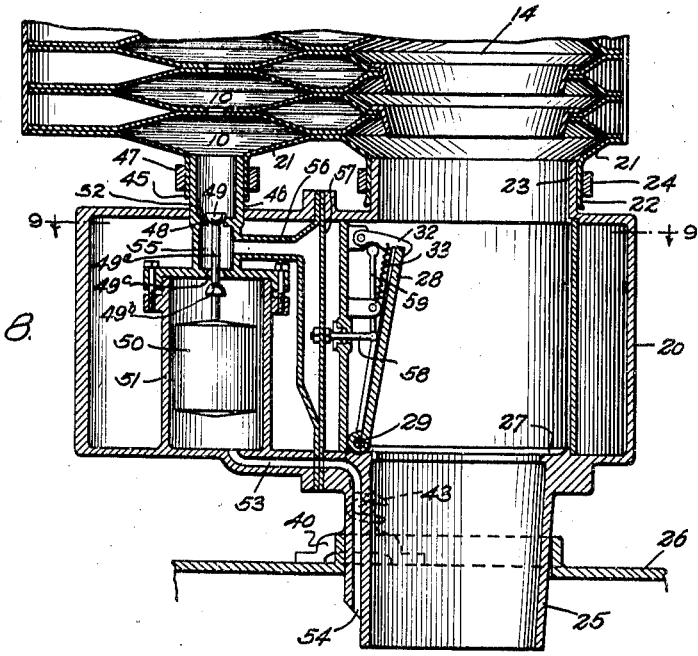
Fig. 8 is a sectional view through the valve housing and associated mechanism on the end of the pipe.

Referring now to these drawings in which similar reference characters indicate similar parts, the conduit indicated generally at 1 is built up from a number of substantially flat sheets which may be considered in pairs. Considering the pair of sheets 2 and 2′, which may be of rubberized canvas or the like, these sheets are provided toward their front part with registering holes the edges of which are indicated at 4, so that when the sheets are assembled in superposed relation there will be a continuous passage through them. The outer edges of the pair of sheets 2 and 2′ are joined together on the line 3, all the way from front to rear, as by cementing for example. The inner edges 4 of the sheets 2 and 2′ are not attached to each other but may pull apart as shown in Fig. 3.

The outer edges of the next pair of sheets, marked 5 and 5′ are joined together along the line 3′. These sheets are provided with holes, the edges of which are indicated at 4′. The adjoining edges 4 and 4′ are secured together, as by cementing, or vulcanizing throughout, the sheets thus being assembled in bellows formation.

Toward the rear of the conduit the sheets 2 and 2′ and 5 and 5′ are cemented or vulcanized throughout to each other, over the small area 7, so that when the sheets are pulled apart passages 8 open to the atmosphere are formed. Adjoining sheets of different pairs of sheets, such as 2′ and 5 are cemented together over the area 9, forming closed chambers sealed against the air. All of the sheets are provided with small registering holes 12, putting all of the chambers 10 in communication with each other.

A metallic or other reinforcement 13 may be crimped around or cemented to the pairs of sheets 2 and 2′, 5 and 5′, etc., respectively, for stiffening and strengthening the assembly.

The registering holes in the several sheets form a liquid conduit 14. In order to facilitate the free flow of liquid through this passage, there is provided at each edge 4, 4′, a plurality of downwardly extending lips 15, which more or less telescope and overlap with each other to form a smoother fluid conduit. These lips 15 could be integral, if desired, with the sheets.

The several sheets forming the conduit are of general streamline formation for lessening the air resistance as shown in Fig. 4. For further lessening air resistance the conduit 1 is covered in whole or in part with an elastic enveloping membrane 16, of rubber or the like, which allows the several conduit sections to expand and contract the desired amount. In order to prevent the formation of any suction or pressure effect as the sections expand and contract, this enveloping membrane may have a number of air apertures 17 in it, as indicated in Fig. 2.

Since the conduit is flexible, the wind pressure would tend to bow it back as in Fig. 6. In order to counteract this, the interconnected chambers 10 are subjected to a suction or partial vacuum, which tends to draw them together, which would tend to shorten the back of the pipe and would tend to bow the pipe into the wind as shown in Fig. 5. These two factors counteract each other so that the pipe, in use, would hang straight as shown in Fig. 7. The means for subjecting the interconnected chambers 10 to a suction or partial vacuum will be described below.

*The valve mechanism*

Carried at the lower end of the pipe is a housing member indicated geenerally at 20. The lowermost of the bellows elements 21 has a downward lip 22 which takes over a flange 23 on the housing being secured thereto by a collar 24. Leading from the housing 20 is a delivery pipe 25 designed to deliver fluid into the reservoir 26 on the receiving ship. The housing is provided with a valve seat 27 adapted to be closed by a valve 28 pivoted on the shaft 29 to move therewith. On one end of the shaft 29 there is secured a handle 30 by which the shaft 29 may be rotated. A pivoted latch 32 urged downwardly by spring 33 tends to hold the valve 28 in the open position. The valve is connected with its handle 30 so that if the handle is released by the operator, the valve will be closed automatically by flow of fluid. To this end the handle 30 is provided with a pivoted member 34 the outer end 35 of which engages with a rod 36 which slides in the shaft 29. The end of the rod 36 comes out of the shaft 29 through a slot 37 and is bent upwardly as at 38 so as to be in a position to engage the latch 32. If the operator should release the handle 30 a spring 39 would push the pivoted member 34 so as to cause the end 38 of the handle to disengage the latch 32 whereupon 28 would close.

Mounted on the reservoir 26 of the receiving ship is a pair of standards 40 provided with pintles 42. The shaft 29 already described is provided with a pair of hooks 43 fixed to rotate with the shaft, so that when the handle 30 is turned counterclockwise so as to open the valve 28, the hooks 43 will engage the pintles 42 for holding the housing member 20 in position to deliver the fluid to the reservoir 26. If the operator releases the handle, valve 28 is closed as already described, and at the same time the hooks 43 will be swung to the left, Fig. 8, and automatically disengaged from the pintles 42.

Mechanism for automatically releasing the valve when the reservoir 26 is substantially full will now be described.

The lowermost bellows member 21 is provided with a downwardly extending lip 45 which engages over a nipple 46 on the housing 20 being secured thereto by collar 47. The nipple 46 is provided with a valve seat 48 on which is seated a valve 49 connected by rod 49a with a float 50 moving in the float chamber 51. A valve 49b on rod 49a is adapted to seat against valve seat 49c in the top of the chamber 51. The valve seat 48 is provided with a small by-pass 52 which subjects the interior of the float chamber to a slight suction. The housing 20 is provided with means forming a passage 53 communicating with the float chamber 51 and having a lower opening 54 which would be located near the top of the receiving reservoir 26 when the apparatus is in fluid delivering position. When the reservoir has been filled to the level of the opening 54 the suction within the float chamber will draw up fluid into the float chamber which will cause the float to rise, close valve 49b and open valve 49, and create a strong suction in a chamber 55 just below the valve. The chamber 55 is connected through pipe 56 with one side of the diaphragm 57, to the center of which is connected a rod 58 pivoted to a pivoted trip member 59. When the float rises and subjects the chamber 55 to this strong suction, diaphragm 57 will be pulled to the left, moving the upper end of the strip member to the right, tripping the valve which will close, due to gravity and the downward rush of fluid.

*The reeling mechanism*

The fuselage of the mother ship is indicated at 65. Toward the rear part of the fuselage there is mounted a winding drum or reel 66, mounted substantially concentrically with the fuselage, that is to say, the axis of the reel and the axis of the fuselage are substantially coincident. Encircling the longérons 67 of the fuselage there is a plurality of rings 68. Grooved or other suitable rollers 69 roll on these rings 68 and serve as a bearing and mounting for the reel 66, just outside these rollers.

The reel may be turned by hand, but power means is preferably provided for turning it; to this end there is provided a grooved wheel 70 of substantially the same diameter as the reel in which is mounted a driving cable 72 which engages over a pulley 73 mounted on the rotating armature of a motor 74 which is connected to be rotated in either direction by well known means, such as a rheostat and reversing switch.

The streamlined conduit 1 will lay on the reel substantially as shown in Figs. 11 and 12. The fuselage is provided with fairing, as at 65′, for lessening wind resistance.

To provide suction for the vacuum chambers 10, a suction pipe 76 is connected at its suction end to the upper end of conduit 1; pipe 76 is connected to any suitable vacuum producing means such as a wind driven vacuum pump 77 driven by the propeller 78. The propeller is connected to turn the cylindrical member 79 which is centrally slotted; in the slots of 79 there is a pair of vanes 80 urged apart by a spring 81. Oil may be supplied to pipe 76, the inflowing air carrying the oil to the vanes. When 79 turns in a counterclockwise direction, Fig. 15, a suction is produced which is communicated to the chambers 10 of the conduit 1. An important aspect of this particular vacuum producing means is that the faster the mother ship is flying, the stronger the suction produced, and therefore the greater the bowing effect, which tends to counteract the wind pressure as described in connection with Fig. 6.

Figure 9:
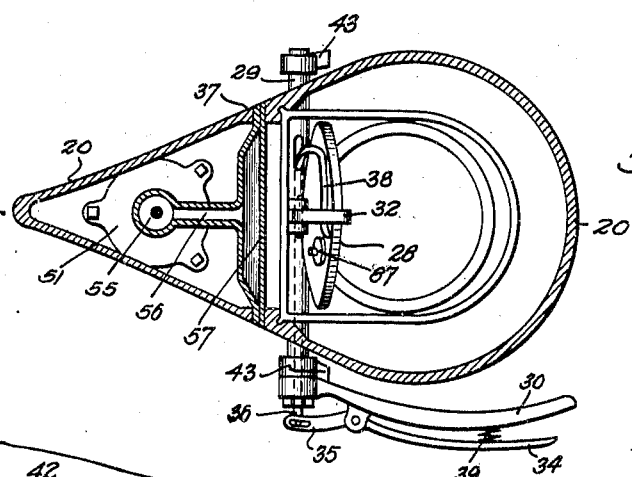
Fig. 9 is a section on the line 9—9 of Fig. 8.
Figure 10:
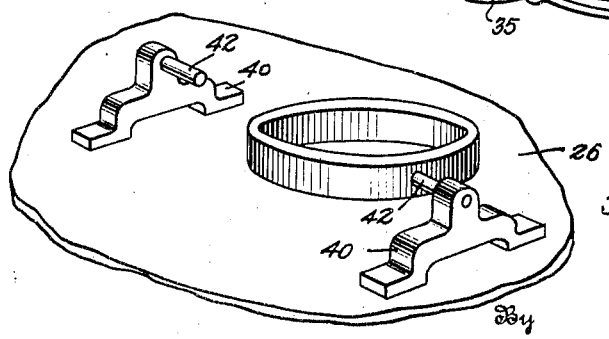
Fig. 10 shows a detail of the receiving reservoir.

The upper end of the pipe is permanently coupled to the fuel reservoir 85 in the mother ship, and the uppermost of the vacuum chambers 10 is permanently coupled with the suction pipe 76. A pilot rope 86 is attached at its lower end to the lower end of the conduit, as at 87, while its upper end winds on the reel 66. In winding up the conduit, the reel is rotated, which first winds up the pilot rope, it in turn pulling up the conduit, which in turn is wound on the reel. As the conduit is wound up any liquid remaining in the conduit will drain back into the reservoir 85, an upwardly opening check valve 87, Fig. 9, in valve 28 admitting air to relieve the suction effect which such drainage might cause.

While the invention has been described in some detail in its present preferred form, it should be understood that this disclosure is illustrative and not restrictive of the invention, and that it can be carried out in other ways, as falling within the scope of the claims.

I claim as my invention:

1. A refueling conduit for transferring liquids from one aircraft to another during flight wherein the conduit is made up of interconnected bellows sections of rubberized canvas or the like, which can move toward and away from each other, for varying the effective length of the conduit.

2. A refueling conduit for transferring liquids from one aircraft to another during flight wherein the conduit is made up of bellows sections, vulcanized together, which can move toward and away from each other, for varying the effective length of the conduit.

3. A refueling conduit for transferring liquids from one aircraft to another during flight wherein the conduit is readily extensible for compensating for relative movement between the aircraft during the refueling operation and is provided with means for counteracting the wind pressure.

4. A refueling conduit for transferring liquids from one aircraft to another during flight wherein the conduit is made up of interconnected sections which can move toward and away from each other, for varying the effective length of the conduit, the conduit being provided with means tending to cause the conduit to bow into the wind, for counteracting the backward push of the wind on the conduit.

5. A refueling conduit for transferring liquids from one aircraft to another during flight wherein the conduit is made up of interconnected bellows sections which can move toward and away from each other, for varying the effective length of the conduit, the conduit being provided with means tending to shorten the rear part thereof, for counteracting the backward push of the wind on the pipe.

6. A refueling pipe for aeronautic use, comprising a plurality of non-metallic bellows sections, vulcanized together, which expand and contract, for varying the length of the pipe.

7. A refueling pipe for aeronautic use, comprising a plurality of interconnected bellows sections which expand and contract, for varying the length of the pipe, the bellows sections being assembled in stream-line formation.

8. A refueling pipe for aeronautic use, comprising a plurality of interconnected bellows sections which expand and contract longitudinally of the pipe, for varying its length, the interior of the several sections being provided with downturned lips defining a fluid passage.

9. A refueling pipe for aeronautic use, comprising a plurality of interconnected bellows sections which expand and contract longitudinally of the pipe, for varying its length, the interior of the several sections being provided with overlapping downturned lips defining a fluid passage.

10. A refueling pipe for aeronautic use, comprising a plurality of interconnected bellows sections which expand and contract, for varying the length of the pipe and means for exerting a contracting pull lengthwise of the pipe, for shortening it.

11. A refueling pipe for aeronautic use, comprising a plurality of interconnected bellows sections which expand and contract, for varying the length of the pipe, the bellows sections being assembled in stream-line formation and means for exerting a contracting pull lengthwise of the pipe, for shortening it.

12. A refueling pipe for aeronautic use, comprising a plurality of interconnected bellows sections which expand and contract, for varying the length of the pipe and air pressure actuated means for exerting a straightening force on the pipe.

13. A refueling pipe for aeronautic use, comprising a plurality of interconnected bellows sections which expand and contract, for varying the length of the pipe and air pressure actuated means for exerting a contracting pull on the rear part of the pipe, so as to counteract the wind pressure.

14. A refueling pipe for aeronautic use, comprising a plurality of interconnected bellows sections which expand and contract, for varying the length of the pipe and vacuum actuated means for exerting a contracting pull on the rear part of the pipe, to give it a tendency to bow into the wind.

15. A refueling conduit for transferring liquids from one aircraft to another during flight wherein the conduit is made up of interconnected sections which can move toward and away from each other, for varying the effective length of the conduit and an elastic envelope around the several sections.

16. A refueling conduit for transferring liquids from one aircraft to another during flight wherein the conduit is made up of interconnected sections which can move toward and away from each other, for varying the effective length of the conduit and an elastic enveloping membrane around the bellows sections.

In testimony whereof I have affixed my signature.

BYRON H. SHINN.